United States Patent [19]

Shinbori et al.

[11] 4,345,829
[45] Aug. 24, 1982

[54] PROGRAM-CONTROLLED CAMERA

[75] Inventors: Kenichi Shinbori, Kawasaki; Shinji Sakai; Nobuhiko Shinoda, both of Tokyo; Tadashi Ito, Yokohama; Hiroyasu Murakami, Tokyo, all of Japan

[73] Assignee: Canon Kabushiki Kaisha, Tokyo, Japan

[21] Appl. No.: 128,400

[22] Filed: Mar. 10, 1980

[30] Foreign Application Priority Data

Mar. 24, 1979 [JP] Japan .................................. 54-34921

[51] Int. Cl.³ ............................................. G03B 7/087
[52] U.S. Cl. ..................................................... 354/37
[58] Field of Search ............................. 354/36, 37, 38

[56] References Cited

U.S. PATENT DOCUMENTS 4,204,755  5/1980  Toyoda et al. ........................ 354/36

*Primary Examiner*—Michael L. Gellner
*Attorney, Agent, or Firm*—Toren, McGeady & Stanger

[57] ABSTRACT

The present invention concerns with a so-called program-controlled camera where only one different combination of diaphragm aperture and shutter time value is determined based on a different object brightness. Particularly in the program-controlled camera where the object brightness is measured at the full open aperture and then combined with the preset value of film speed to derive a difference between the full open aperture and the effective diaphragm value, in accordance with which the shutter time is controlled while the diaphragm is adjusted to that effective value, a device is provided for carrying out a program shift in automatic response to the full open aperture value of the interchangeable lens used in the camera.

4 Claims, 3 Drawing Figures

PROGRAM-CONTROLLED CAMERA

BACKGROUND OF THE INVENTION

1. Field of the Invention

This invention relates to automatic exposure cameras, and more particularly to a camera having programmed exposure control.

2. Description of the Prior Art

In the conventional type of program-controlled exposure camera, the brightness information Bv, film speed information Sv and full open F-number information Avo of the photographic objective are combined by a program curve based on program constants to derive both of an effective diaphragm value and an effective exposure time. In more detail, as the light value is obtained at the full open aperture, the brightness information representing Bv-Avo has to be combined with the full open F-number information Avo to derive a Bv information which is then combined with the film speed information Sv to obtain an Ev information. This Ev information leads to determine a corresponding one combination of Tv and Av according to a program curve. For this reason, the use of the program in the exposure control requires the provision of a mechanism for setting the full open F-number information Avo of the objective, thus giving a disadvantage of calling for an increase in the complexity of information input mechanism.

Another disadvantage of the conventional type program-controlled exposure camera is that since the Ev value is translated into Av and Tv values in one-to-one correspondence regardless of however large value the full open F-number of the objective is, as has been mentioned above, with the use of an objective lens having a large Avo, when the object brightness is darkened to some extent, the program tends to operate so that the diaphragm is adjusted to the full open value. In general, however, the image quality reaches a highest level when the diaphragm is closed down from the full open aperture by a few stops. If the image quality if prevailed, therefore, it is desirable to shift the program to a direction such that the diaphragm is effectively closed down as when the camera is associated with an interchangeable objective of large Avo. As has been mentioned above, however, according to the prior art, the Avo is not taken into account in determining the Av value. Thus, it has been impossible to control the program shift in accordance with the Avo information.

SUMMARY OF THE INVENTION

An object of the present invention is to provide a program-controlled camera in which the exposure control is made in accordance with a program without the necessity of manual setting of the Avo information, and the program is shifted depending upon the Avo.

Another object of the present invention is to provide a program-controlled camera in which the diaphragm value difference Avs is obtained based on the light value information at the full open aperture, and the diaphragm is controlled by said Avs whereby the program control is made without setting the Avo information.

Still another object of the present invention is to provide a program-controlled camera in which the diaphragm value difference Avs is obtained based on the light value information at the full open aperture, and program constants are given to set forth a relationship $Tv = \alpha Avs + K$, whereby the diaphragm and shutter are controlled based on said diaphragm value and program constants.

These and other objects and features of the present invention will become apparent from the following detailed description of embodiments thereof taken in conjunction with the accompanying drawings.

DESCRIPTION OF THE PREFERRED EMBODIMENT

Figure 1:
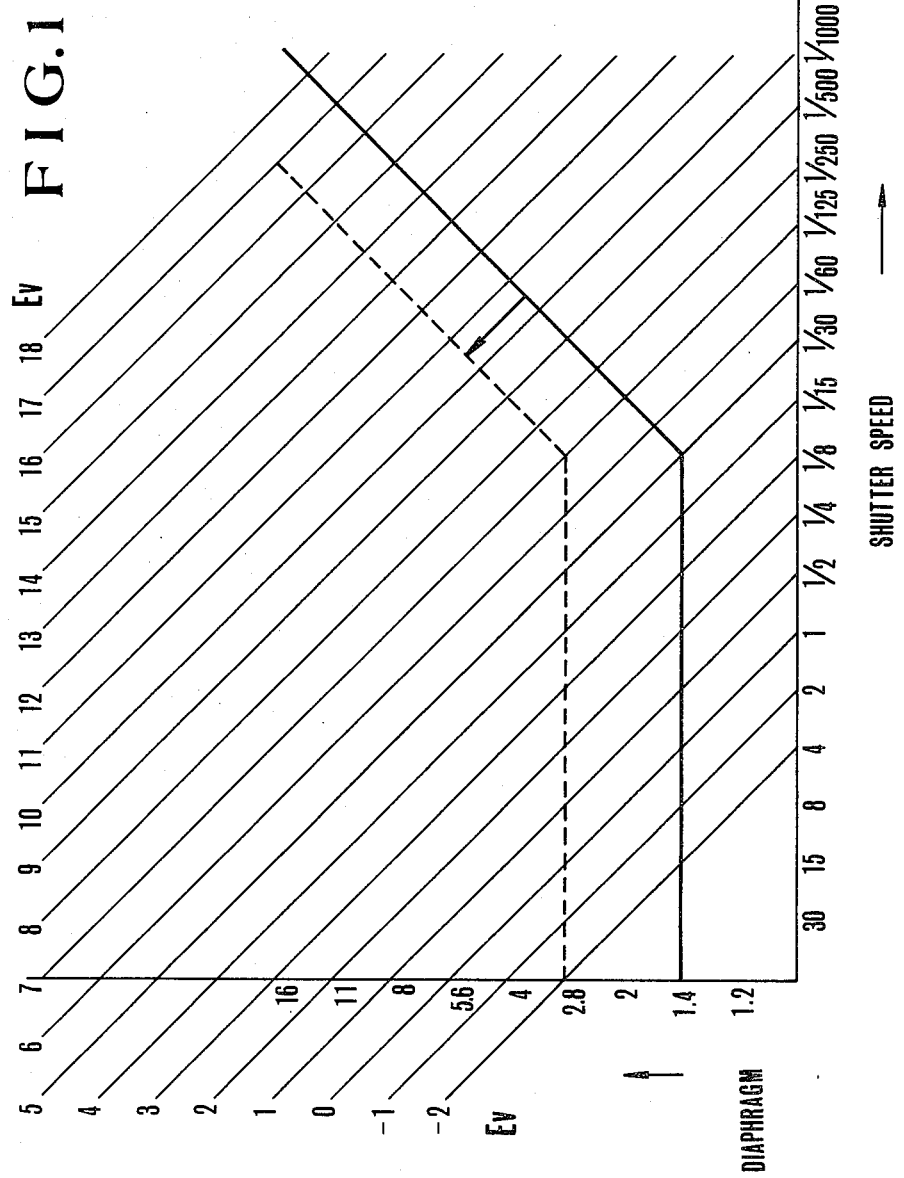
FIG. 1 is a graphic representation of a program in accordance with which the diaphragm and shutter of a camera of the present invention are controlled.

Explanation will next be given to the program-controlled camera of the present invention. Before embarking on explanation of an embodiment of the present invention, the principles of the present invention are described below.

The general formula of relationship in Apex is expressed by:

$$Bv + Sv = Av + Tv \tag{1}$$

Introducing into formula (1) the full open F-number Avo of the used lens, we have:

$$(Bv - Avo) + Avo + Sv = Av + Tv \tag{2}$$

$$Bvo + Sv = (Av - Avo) + Tv$$

$$Bvo + Sv = Avs + Tv$$

where $Bvo = Bv - Avo$, representing the object brightness measured through the photographic objective lens; and $Avs = (Av - Avo)$, or is the stop-numbered diaphragm value representing the difference between the full open diaphragm value Avo and the particular diaphragm value depending upon the Bv.

Program constants are now defined by the following formula:

$$Tv = \alpha Avs + K \tag{3}$$

Then, the Avs and Tv take one combination of values. Now, if $\alpha = 1$, we obtain from the formula (3):

$$Tv = Avs + K \tag{3'}$$

By substituting formula (3)' for formula (2), we have $$Avs = \frac{Bvo + Sv - K}{2} \tag{4}$$

$$Tv = \frac{Bvo + Sv + K}{2} \tag{5}$$

In formulae (4) and (5), the factors determining the Avs and Tv are Bvo, Sv and K, the Bvo denoting the brightness entering through the lens as has been mentioned above, and the Sv and K denoting the preset film sensitivity and constant respectively. Therefore, the Avs and Tv can be evaluated without the necessity of presetting the Avo information from the outside. If the diaphragm aperture and shutter time are controlled based on the Avs and Tv, it is made possible to perform a program-controlled exposure operation without the use of an Avo information setting mechanism.

In formula (4), suppose the brightness Bv is Bv1 at a selected time, and the full open F-number is Avo1, then we have:

$$Avs = Av1 - Avo1 = \frac{Bv1 - Avo1 + Sv - K}{2} \quad (4)'$$

where Av1 is the absolute diaphragm value resulting in a proper exposure when the brightness takes Bv1, and the full open F-number is Avo1. Again, in formula (4), suppose the brightness is Bv1 and the full open F-number of the interchanged lens is Avo2, then we have $$Avs = Av2 - Avo2 = \frac{Bv1 - Avo2 + Sv - K}{2} \quad (4)''$$

where Av2 is the absolute diaphragm value required to make a proper exposure when the brightness is Bv1 and the full open F-number is Avo2. By substracting formula (4)'' from formula (4)', we obtain:

$$(4)' - (4)'' = Av1 - Avo1 - Av2 + Avo2 = \frac{Avo2 - Avo1}{2}$$

By rearranging this equation, we have:

$$Av1 - Av2 = \frac{Avo2 - Avo1 - 2Avo2 + 2Avo1}{2} \quad (6)$$

$$= \frac{Avo1 - Avo2}{2}$$

Therefore, $$Av2 = Av1 - \left(\frac{Avo1 - Avo2}{2}\right).$$

Letting $Avo2 - Avo1 = \Delta Avo$, we arrive at the following formula:

$$Av2 = Av1 + \frac{\Delta Avo}{2} \quad (7)$$

On the other hand, the equations for shutter times Tv1 and Tv2 required to make a proper exposure when the diaphragm value is the above described Av1, or Av2 respectively, can be derived from formula (3)' as follows:

$$Tv1 = Avs + K = Av1 - Avo1 + K \quad (8)$$

$$Tv2 = Avs + K = Av2 - Avo2 + K \quad (9)$$

By subtracting formula (9) from formula (8), we obtain:

$$Tv1 - Tv2 = Av1 - Av2 - Avo1 + Avo2 \quad (10).$$

Substituting formula (7) for formula (10), we have:

$$Tv1 - Tv2 = Av1 - Av1 - \frac{\Delta Avo}{2} Avo1 + Avo2$$

-continued $$= -\frac{\Delta Avo}{2} + \Delta Avo = \frac{Avo}{2}$$

Hence, we find:

$$Tv2 = Tv1 - \frac{\Delta Avo}{2} \quad (11)$$

As is evident from formulae (7) and (11), when the standard lens of the full open F-number (for example, Avo1) is replaced by a lens of different full open F-number (for example, Avo2), the program is automatically shifted with the diaphragm value by a ($\Delta Avo/2$) stop in positive sense, and with the shutter speed by a ($\Delta Avo/2$) step in negative sense. According to the present invention, therefore, as shown in FIG. 1, the program is shifted from the solid line position to the dashed line position where it is insured that photographs are to be taken with improved image quality on account of the given full open F-number.

Next, an example of practical embodiment of the present invention will be described.

Figure 2:
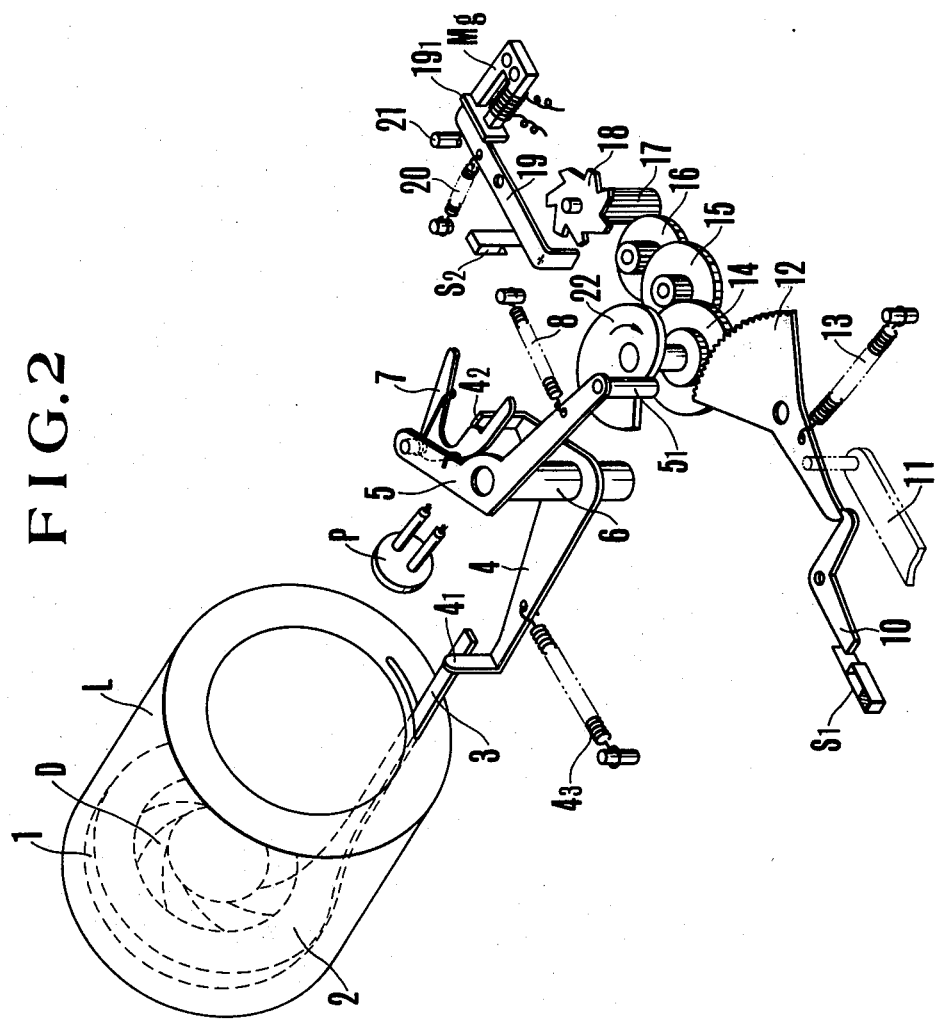
FIG. 2 is a perspective view of one embodiment of a diaphragm control mechanism for a single lens reflex camera applied to the program-controlled camera of the present invention.

FIG. 2 is a view of an example of construction and arrangement of a diaphragm control mechanism of a single lens reflex camera applied to a program-controlled camera of the present invention. In the figure, L is an interchangeable lens; 1 is a diaphragm device incorporated in the lens L; 2 is a diaphragm ring; 3 is a linkage lever extending from the diaphragm ring 2; D is diaphragm blades; 4 is a diaphragm closing down drive lever; $4_1$ is a bent-off portion for engagement; $4_3$ is a return spring; 5 is a two-armed charge lever pivoted on a common shaft 6 of the lever 4 and carrying at its end portion an engagement pawl 7; 8 is a drive spring; $5_1$ is a pin planted on one end of the lever 5; 10 is a release lever; 11 is a lever cooperative with a winding mechanism; 12 is a main drive sector gear; 13 is a charge spring; 14–18 are spaced adjusting gears; 19 is an arresting member; $19_1$ is an armature fixedly secured to one end of the arresting member 19; 20 is a return spring; 21 is a stopper pin; Mg is an electro-magnet; and 22 is a speed adjusting cam rotatable in unison with the gear 14 on a common axis.

P is a photo-sensitive element such as CdS and SBC though shown as arranged behind the lens for convenient and clear illustration purposes but practically arranged in the finder optical path at such a location as not to disturb the exposure, or above the reflection mirror.

S1 is a memory switch of an EVR (to be described later); and S2 is a memory switch for an inverted signal TV (to be described later) of the EVR.

Figure 3:
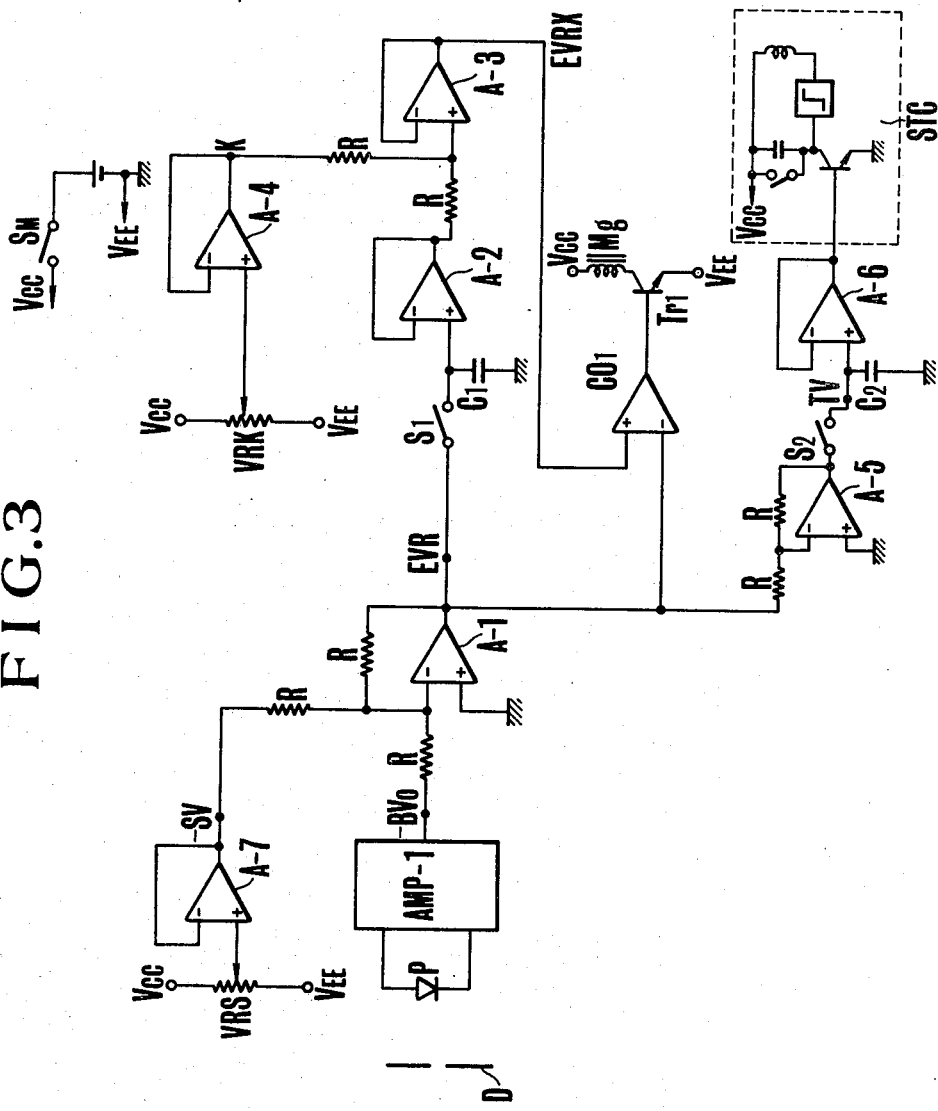
FIG. 3 is an electrical circuit diagram of one embodiment of an exposure control circuit in the program-controlled camera according to the present invention.

FIG. 3 is an electrical circuit diagram showing one embodiment of an exposure control circuit applied to the program-controlled camera according to the present invention. In FIG. 3, VRS is a variable resistor for setting film speed information selected by a film speed information setting dial (not shown); A7 is an operational amplifier, the output of said amplifier A7 representing $-Sv$ value. P is the photosensitive element of FIG. 2; AMP-1 is a known light-metering amplifier for logarithmically compressing the output of the photosensitive element. Since said photo-sensitive element receives light entering through the lens, the output of said light-metering amplifier represents $-Bvo$. A-1 is an operational amplifier forming an adder circuit for adding the above-described Sv and Bvo to produce an output: $Bvo + Sv = EVR$. S1 is the switch of FIG. 2, and $C_1$ is a memory condenser connected through said switch S1 to the output of the amplifier A-1. A-2 is an operational amplifier connected to the above-described condenser $C_1$; VRK is a variable resistor for setting a program constant K; and A-4 is an operational amplifier. A-3 is an operational amplifier having an input terminal connected to the output terminals of the amplifiers A-2 and A-4, and so constructed that the amplifier A-3 produces an output in the form of $$\frac{Bvo + Sv + K}{2} = EVRX.$$

$CO_1$ is a comparator having a (+) input terminal to which the above described EVRX is applied and a (−) input terminal to which the output of the amplifier A-1 is applied. Tr1 is a transistor with its base connected to the output terminal of the comparator $CO_1$, and Mg is the magnet of FIG. 2 connected to the collector of the transistor Tr1. A5 is an operational amplifier constituting an inversion amplifier; S2 is the switch shown in FIG. 2; C2 is a memory condenser connected through the switch S2 to the output terminal of the amplifier A5, A6 is a buffer amplifier; STC is an electronic shutter circuit of known construction for controlling the shutter time based on the shutter time information memorized in the condenser C2.

The operation of the embodiment of the present invention shown in FIGS. 2 and 3 will be described below.

Now assuming that a shutter button (not shown) is depressed, its first stroke causes a main switch SM to be turned on to supply the various circuits of FIG. 3 with electrical power, thereby the constituent elements are rendered operative. Then, the amplifier A-1 produces the output of $EVR = Bvo + Sv$ which is applied through the switch S1 to the condenser C1 and said EVR value is memorized therein. After that, upon further depression of the shutter button, the lever 10 is turned in a clockwise direction to turn off the switch S1, thereby the EVR is stored in the condenser C1. Further the sector gear 12 is released from engagement with the lever 10. Since, at this time, the magnet Mg is energized by current flowing through the winding thereof, the arresting member 19 takes the illustrated position shown in FIG. 2. Therefore, when the engagement by the lever 10 is released, the sector gear 12 turns in a counterclockwise direction by the force of the spring 13, while driving the speed adjusting gears 14 to 18 to rotate. As a result, the cam 22 on the gear 14 starts to rotate at a constant speed.

By the rotation of the cam 22, the pin $5_1$ cooperates with the force of the spring 8 to turn the lever 5 in a clockwise direction in correspondence to the lifted amount of the cam 22 and the diaphragm drive lever 4 to turn in a clockwise direction through the pawl 7. As a result, the lever 3 turns in a counterclockwise direction, thus starting to gradually close down the diaphragm blades D of the diaphragm device 1. As a result, the output of the amplifier A-1 gradually changes. When the output of the amplifier A-1 coincides with the above-described output EVRX, the comparator $CO_1$ inverts to turn off the transistor Tr1, thereby the magnet Mg is de-energized. Therefore, the arresting member 19 is turned by the spring 20 in a counterclockwise direction to engage with the gear 18, and the closing down operation of the diaphragm device 1 is terminated.

As has been mentioned above, the EVRX is $$\frac{Bvo + Sv + K}{2}.$$

Therefore, when the comparator $CO_1$ has inverted, the voltage appearing at the (−) input terminal of the comparator becomes $$Bvx + Sv = \frac{Bvo + Sv + K}{2},$$

where Bvx is the brightness value measured through the opening of the actually closed down diaphragm. For this reason, $$Bvx = \frac{Bvo - Sv + K}{2}.$$

Further since the Bvx is expressed by $Bv - Av$, and the Av by $Avo + Avs$, we have $$Bvx = Bv - Avo - Avx = Bvo - Avs = \frac{Bvo - Sv + K}{2}.$$

From this, we obtain $$Avs = \frac{Bvo + Sv - K}{2}.$$

Thus, the Avs value taken at the time of inversion of the comparator $CO_1$ coincides with formula (4). Therefore, it will be appeciated that the diaphragm is controlled based on the Avs of formula (4). When the diaphragm has been controlled based on the Avs of formula (4) in such a manner, as has been mentioned above, the arresting member 19 turns in the counterclockwise direction to engage the gear 18 with the result that the closing operation is terminated, and such rotation of the arresting member 19 also causes the switch S2 to be turned off. Therefore, the output of the amplifier A-1 occuring at this time is inverted by the amplifier A5 forming the inversion circuit and is stored on the condenser C2. As has been mentioned above, since the output of the amplifier A-1 taken at the time of termination of the diaphragm closing down operation is the above-described $$EVRX \left( = \frac{Bvo + Sv + K}{2} \right)$$

the inverted output representative of a value coincident with the Tv value of formula (5) is stored on the condenser C2. After that, a drive release mechanism of known construction for starting movement of the mirror followed by the front curtain of the shutter is initiated to operate, thereby the mirror is flipped upward, the shutter runs down, and the count switch S3 is turned off. The period of actuation of the shutter is controlled by the electronic shutter circuit STC based on the shutter time value memorized in the condenser C2.

As has been mentioned above, in said embodiment, the diaphragm and shutter are controlled based on the Avs and Tv of the above-described formulae (4) and (5), thus the program proceeds without the setting of Avo information, and the program shift is automatically resulted in response to the full open F-number of the used lens.

The foregoing description has been discussed in connection with the $\alpha$ in formula (3) set to 1. Even when not $\alpha=1$, the program control is made possible without the setting of Avo information likewise as when $\alpha=1$. That is, substituting $Tv=\alpha Avs+K$ of formula (3) for the Tv of formula (2), we obtain $$Avs = \frac{Bvo + Sv - K}{\alpha + 1} \qquad (4A)$$

$$Tv = \frac{\alpha(Bvo + Sv) + K}{\alpha + 1}. \qquad (5A)$$

Thus, when other than $\alpha=1$, it is possible to perform the program control without the Avo information.

Then, suppose that the brightness Bv is Bv1 and the full open F-number is Av1, formula (4A) becomes $$Avs = Av1 - Avo1 = \frac{Bv1 - Avo1 + Sv - K}{\alpha + 1} \qquad (4A)'$$

where Av1 is the diaphragm value required to effect a proper exposure when the brightness is Bv1 and the full open F-number is Avo1.

Further suppose the full open F-number Avo1 is changed to Avo2 with the brightness Bv1 unchanged, the formula (4A) becomes $$Avs = Av2 - Avo2 = \frac{Bv1 - Avo2 + Sv - K}{\alpha + 1} \qquad (4A)''$$

where Av2 is the diaphragm value required to effect a proper exposure when the brightness is Bv1 and the full open F-number is Avo2.

Putting (4A)'−(4A)'', we obtain $$Av1 - Avo1 - Av2 + Avo2 = \frac{Avo2 - Avo1}{\alpha + 1}$$

Hence we find $$Av1 - Av2 = \frac{\alpha(Avo1 - Avo2)}{\alpha + 1} \qquad (6A)$$

$$Av2 = Av1 - \left[\frac{\alpha(Avo1 - Avo2)}{\alpha + 1}\right]$$

Then, putting Avo2−Avo1=Avo, we obtain $$Av2 = Av1 + \frac{\alpha \Delta Avo}{\alpha + 1}. \qquad (7A)$$

On the other hand, letting Tv1 denote the shutter time value required to effect a proper exposure when the diaphragm value is the above-mentioned Av1, and Tv2 the shutter time value required to effect a proper exposure when the diaphragm value is the above-mentioned Av2, we obtain from formula (3):

$$Tv1 = Avs + K = \alpha(Av1 - Avo1) + K \qquad (8A)$$

$$Tv2 = Avs + K = \alpha(Av2 - Avo2) + K \qquad (9A).$$

Putting (8A)−(9A), we have $$Tv1 - Tv2 = \alpha(Av1 - Avo1 - Av2 + Avo2) \qquad (10A).$$

Substituting formula (7A) of formula (10A), $$Tv1 - Tv2 = \frac{\alpha \Delta Avo}{\alpha + 1}$$

is obtained.
Thus, we find $$Tv2 = Tv1 - \frac{\alpha \Delta Avo}{\alpha + 1}. \qquad (11A)$$

As is evident from formulae (7A) and (11A), responsive to the full open F-number, the camera shifts the diaphragm by $$\frac{\alpha}{\alpha + 1} \Delta Avo$$

stop in a positive sense, and the shutter time by $$\frac{\alpha}{\alpha + 1} \Delta Avo$$

stop in a negative sense.

As has been mentioned above, in the program-controlled camera according to the present invention, the stop-numbered diaphragm value is computed in one-to-one relation based on the Bvo information obtained at the full open aperture light metering, and by this diaphragm value the diaphragm is controlled, so that it is made possible to effect the program control without the Avo information, and the program shift is carried out in automatic response to the Avo of the used lens, thus giving many advantages in the program-controlled camera.

What is claimed is:
1. A camera comprising:
    (a) a light measuring circuit for producing an output corresponding to a value Bvo representing the brightness value measured at the fully open aperture value of an interchangeable lens;
    (b) information setting means for entering data corresponding to a value Sv representing the speed of film to be used;
    (c) a program constant signal forming circuit for producing a signal representative of a selected program constant K, said signal forming circuit being arranged so that the value of the program constant K can be selected irrespective of the aperture value; and
    (d) a control circuit for controlling the aperture and shutter time in accordance with the output of said light measuring circuit, the data from said information setting means and the value of the signal from the program constant signal forming circuit based on the Apex equation: $Bvo+SV=Avs+Tv$ and the formula: $Tv=\alpha Avs+K$ in which $\alpha=$ is a constant and Avs in the stop-numbered diaphragm value.
2. A camera comprising:
    (a) a light measuring circuit for producing an output corresponding to a brightness value Bvo measured at the fully open aperture value of an interchangeable lens;
    (b) information setting means for setting data Sv corresponding to film speed;

(c) a program constant signal forming circuit, said circuit producing a signal representative of a program constant K which can be adjusted irrespective of the aperture value;

(d) an aperture control circuit responsive to said value Bvo, value Sv and K for computing a value Avs based on the formula $$Avs = \frac{Bvo + Sv - K}{\alpha + 1}$$

where $\alpha$ = constant), and regulating the aperture in accordance with the value Avs; and (e) a shutter control circuit responsive to said value Bvo, value Sv and K for computing a value Tv based on the formula $$Tv = \frac{\alpha(Bvo + Sv) + K}{\alpha + 1}$$

and controlling the shutter time in accordance with the value Tv.

3. A camera comprising:

(a) a light measuring circuit for producing an output corresponding to a value Bvo, wherein Bvo is a brightness value measured at the fully open aperture value of an interchangeable lens;

(b) information setting means for setting data corresponding to the value Sv;

(c) a program constant signal forming circuit for producing a signal representative of a program constant K which can be set independently of the aperture value;

(d) an aperture control circuit responsive to said values Bvo, Sv and K for computing a value Avs based on the formula $$Avs = \frac{Bvo + Sv - K}{\alpha + 1}$$

(where $\alpha$ = constant), and regulating the aperture in accordance with the value Avs; and (e) a shutter control circuit responsive to said Avs for computing a value Tv based on the operational formula $Tv = \alpha Avs + K$, and controlling the shutter time in accordance with said value Tv.

4. A camera comprising:

(a) a light measuring circuit for producing an output signal corresponding to a brightness of an object and a film speed value Sv, said circuit being arranged for producing a value corresponding to brightness information Bvo at the fully open aperture and an output corresponding to a film speed Sv when the light measurement is performed at a fully open aperture;

(b) a program constant setting circuit for producing an output signal corresponding to a constant K which can be adjusted irrespective of the aperture value of an interchangeable lens;

(c) a computer circuit for computing the output of the constant setting circuit and the output of said light measuring circuit obtained when the light measurement is performed by a fully open aperture so as to produce an output signal representative of Bvo+Sv+K;

(d) diaphragm control means for controlling the aperture, so that as the diaphragm is regulated by the diaphragm control means, the output of said light measuring circuit is varied;

(e) signal forming means responsive to the attainment of a predetermined relationship between the outputs of said computer circuit and said light measuring circuit for producing an output signal;

(f) arresting means responsive to the signal from said signal forming means for stopping the diaphragm regulating operation by said diaphragm control means; and (g) a shutter control circuit for controlling the shutter time based on the output of said light measuring circuit at the time of termination of the diaphragm regulating operation by the diaphragm control means.

* * * * *